United States Patent
Bailey

(10) Patent No.: US 11,021,219 B2
(45) Date of Patent: Jun. 1, 2021

(54) DIGITAL DIRECTION DISPLAY FOR A TROLLING MOTOR

(71) Applicant: NAVICO HOLDING AS, Egersund (NO)

(72) Inventor: Paul Robert Bailey, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 68 days.

(21) Appl. No.: 16/276,057

(22) Filed: Feb. 14, 2019

(65) Prior Publication Data

US 2020/0262524 A1    Aug. 20, 2020

(51) Int. Cl.
| | |
|---|---|
| *B63H 20/00* | (2006.01) |
| *B63B 49/00* | (2006.01) |
| *G01C 21/20* | (2006.01) |
| *G01P 1/07* | (2006.01) |
| *G01P 5/00* | (2006.01) |

(52) U.S. Cl.
CPC .......... *B63B 49/00* (2013.01); *B63H 20/007* (2013.01); *G01C 21/203* (2013.01); *G01P 1/07* (2013.01); *G01P 5/00* (2013.01)

(58) Field of Classification Search
CPC ...... B63H 20/007; B63H 21/265; B63B 49/00
See application file for complete search history.

(56) References Cited

U.S. PATENT DOCUMENTS

| | | | |
|---|---|---|---|
| 4,614,900 A * | 9/1986 | Young ................. | B63H 20/007 |
| 5,525,081 A * | 6/1996 | Mardesich ........... | B63H 20/007 |
| | | | 114/144 E |
| 5,884,213 A | 3/1999 | Carlson | |
| 8,188,876 B1 | 5/2012 | Holley et al. | |
| 9,840,312 B1 | 12/2017 | Clark | |
| 10,414,472 B2 | 9/2019 | Clark | |
| 10,436,887 B2 | 10/2019 | Stokes et al. | |
| 10,677,921 B2 | 6/2020 | Murphy et al. | |
| 2014/0251200 A1 * | 9/2014 | Zimmerman ......... | B63H 25/36 |
| | | | 116/26 |
| 2016/0185431 A1 | 6/2016 | Suzuki et al. | |
| 2016/0325814 A1 | 11/2016 | Antao et al. | |
| 2017/0227639 A1 | 8/2017 | Stokes et al. | |
| 2017/0355430 A1 | 12/2017 | Clark | |

(Continued)

OTHER PUBLICATIONS

FarSounder; Comparing Forward Looking Sonars for Navigation (4 pgs.) Website visited Feb. 15, 2019; http://www.farsounder.com/technology/blog/comparison_of_3d_forward_looking_sonars.

(Continued)

*Primary Examiner* — Andrew Polay
(74) *Attorney, Agent, or Firm* — Nelson Mullins Riley & Scarborough LLP

(57) ABSTRACT

A trolling motor is provided including a position sensor configured to determine the direction of the trolling motor housing, a digital display, a processor, and a memory including computer program code. The computer program code is configured to, when executed, cause the processor to receive position data from the position sensor, generate display data based on the position data, and cause the display data to be displayed on the digital display. The digital display is integrated with the main housing and configured to display the display data so as to provide an indication of the current direction of the trolling motor housing relative to the watercraft.

20 Claims, 11 Drawing Sheets

(56) References Cited

U.S. PATENT DOCUMENTS

2018/0050773 A1    2/2018  Clark
2019/0025069 A1    1/2019  Okuda et al.
2019/0179318 A1*   6/2019  Miller ................... B63H 25/42
2020/0262525 A1    8/2020  Bailey

OTHER PUBLICATIONS

Furuno; the Basics of Sonar (2 pgs) Website visited Feb. 13, 2019 https://www.furuno.com/special/en/sonar/display.html.
Humminbird; We Have You Surrounded—360 Imaging (8 pgs.) Website visited Feb. 13, 2019 https://www.humminbird.com/learn/imaging/360-imaging.
Garmin; Panoptix™ All-Seeing Sonar (19 pgs.) Website visited Feb. 13, 2019 https://explore.garmin.com/en-US/panoptix/.

* cited by examiner

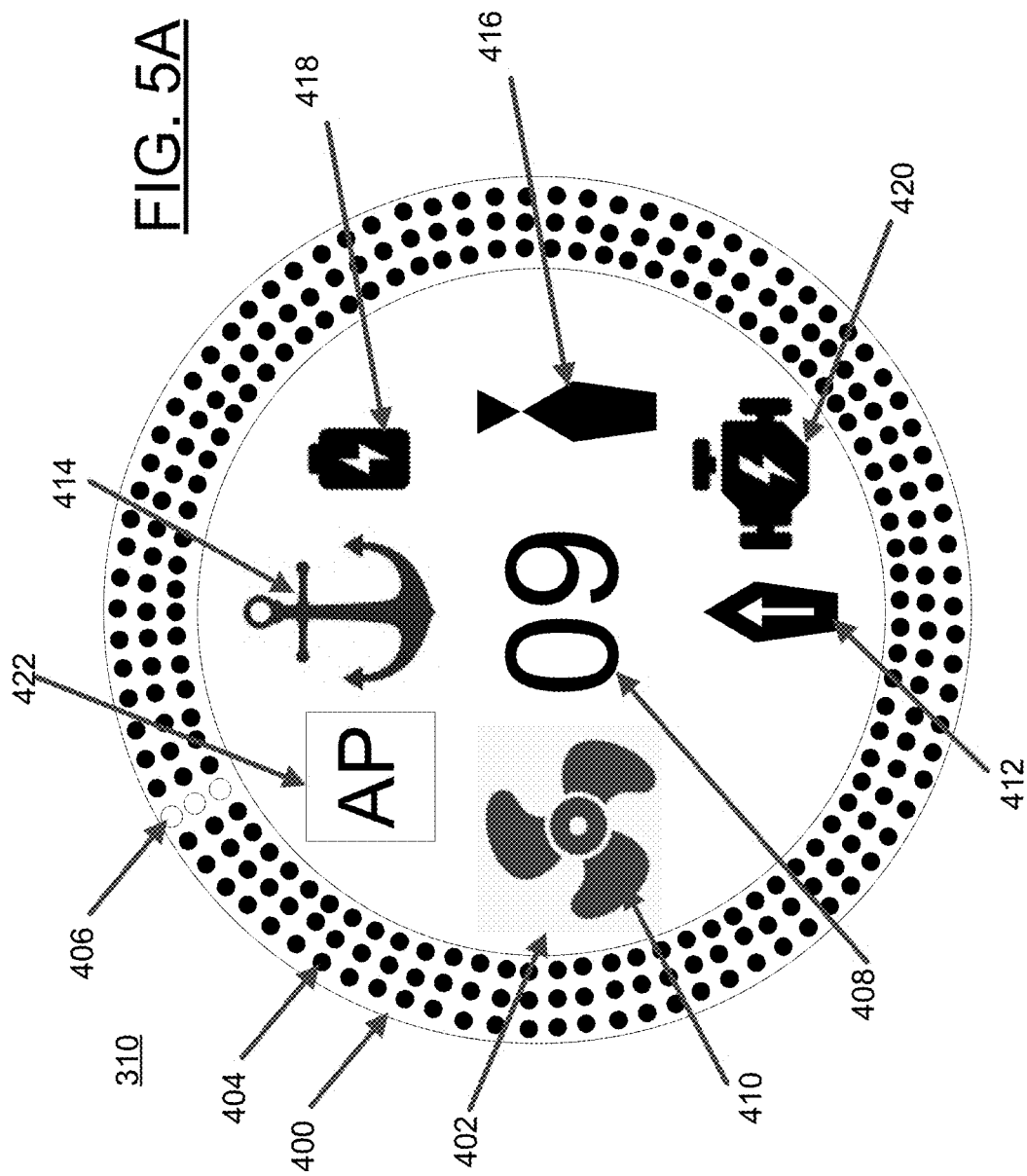

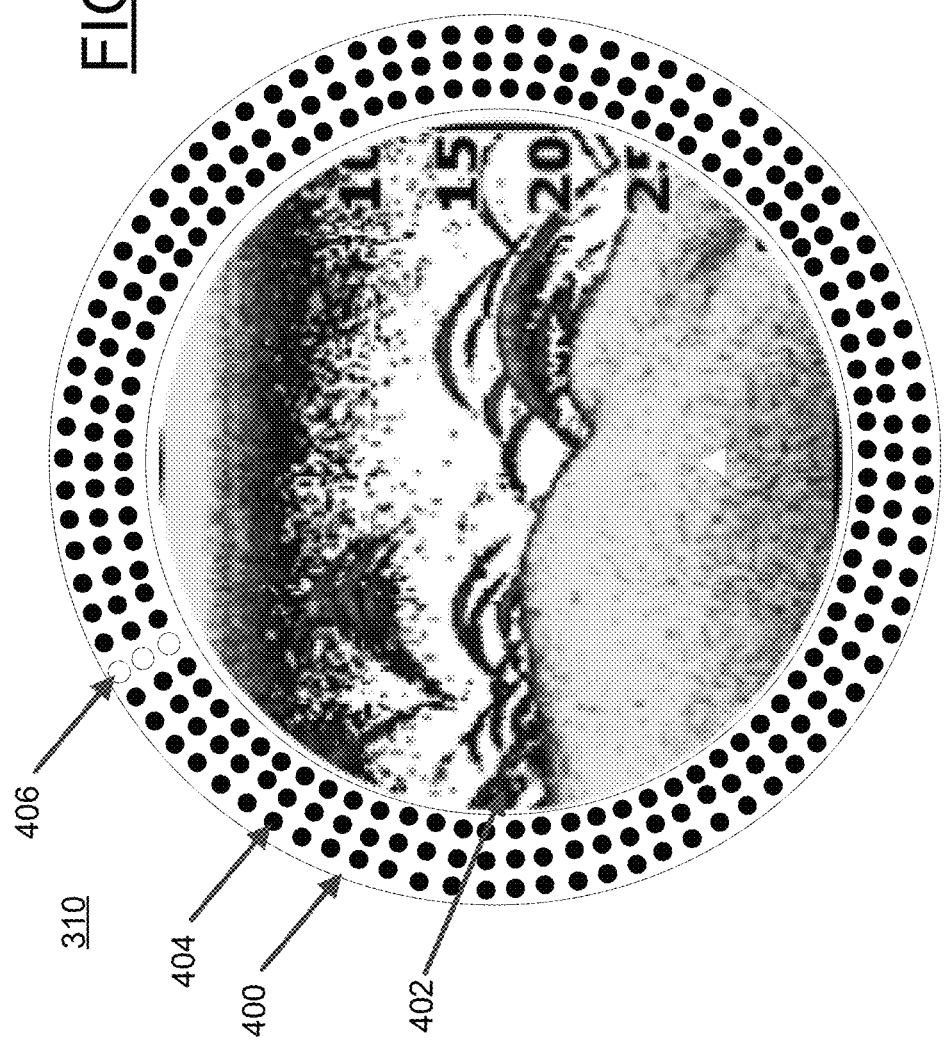

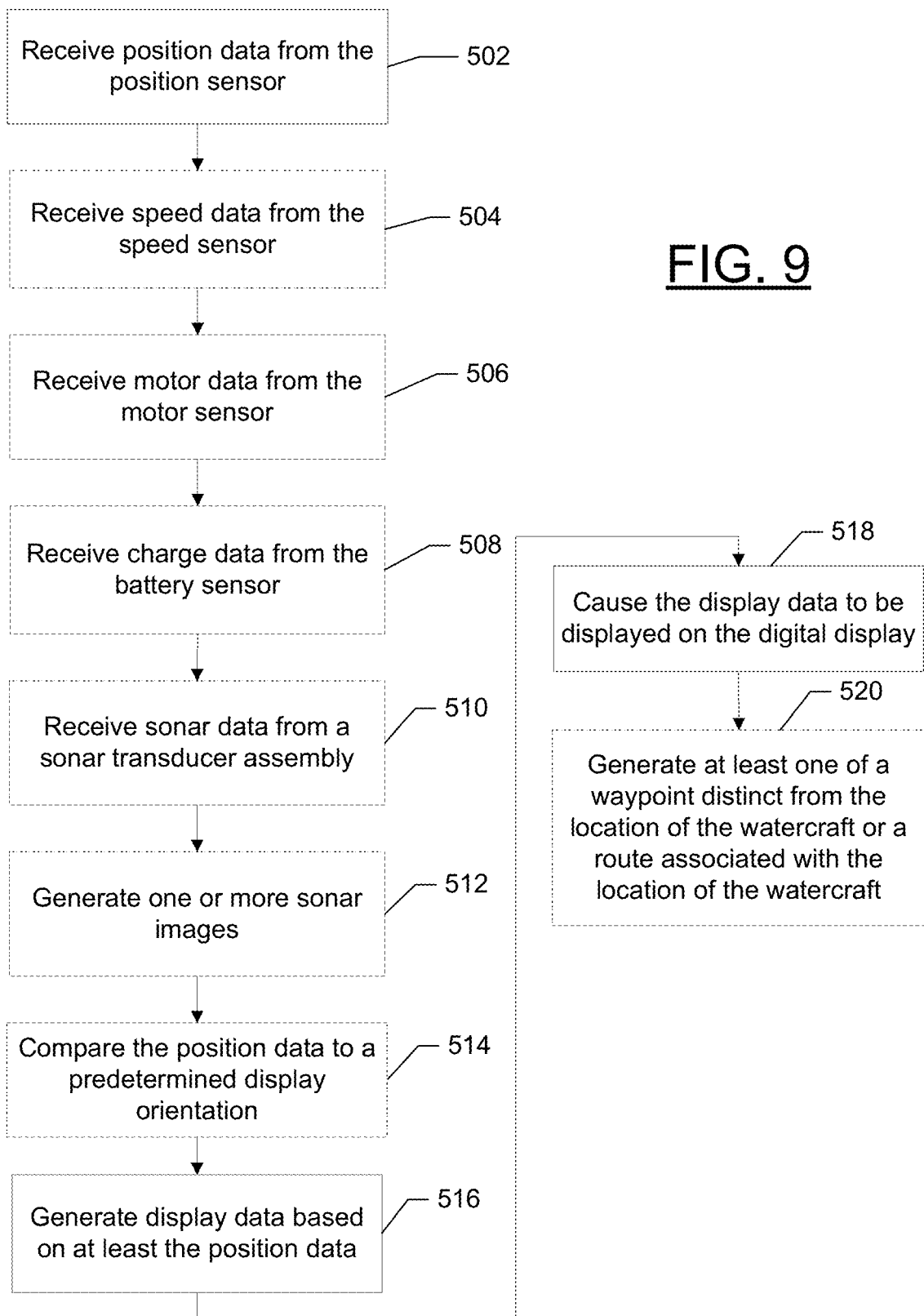

DIGITAL DIRECTION DISPLAY FOR A TROLLING MOTOR

FIELD OF THE INVENTION

Embodiments of the present invention relate generally to trolling motor assemblies and, more particularly, to systems, assemblies, and associated methods for providing a trolling motor assembly with a digital direction display.

BACKGROUND OF THE INVENTION

Trolling motors are often used during fishing or other marine activities. The trolling motors attach to the watercraft and propel the watercraft along a body of water. For example, trolling motors may provide secondary propulsion or precision maneuvering that can be ideal for fishing activities. The trolling motors, however, may also be utilized for the main propulsion system of watercraft. Applicant has developed systems, assemblies, and methods detailed herein to improve features and capabilities corresponding to trolling motors.

BRIEF SUMMARY OF THE INVENTION

Typically, trolling motors, such as trolling motors including fixed heads, include a direction indicator, e.g. an arrow, that indicates the direction of the motor relative to a watercraft. Generally, the direction indicator includes a cable, a ribbon, or other mechanical linkage that rotates the direction indicator with the rotation of the trolling motor shaft. These mechanical linkages may be quite complex, including numerous mechanical components that are difficult to waterproof and subject to mechanical failure or drift.

In some example embodiments, a trolling motor is provided including a position sensor configured to determine the direction of the trolling motor relative to the watercraft. The trolling motor also includes a digital display configured to display the direction of the trolling motor. The position sensor and digital display may enable a less complicated solution that can be more easily water proofed. Additionally, the digital display may be utilized to provide additional information about the trolling motor to the user.

The trolling motor may further include a speed sensor configured to measure the speed of the watercraft through the water. The speed of the watercraft may be displayed on the digital display, enabling the user to determine the speed of the watercraft without referencing other devices. Similarly, the trolling motor may include a motor sensor configured to measure the output of the trolling motor, such as motor speed, motor current, or the like. The digital display may also indicate the output of the trolling motor, such as in raw data or as a percentage of maximum motor output.

In some embodiments, certain features/components of the trolling motor may be powered from one or more batteries of the watercraft or trolling motor. In some example embodiments, the trolling motor may include a battery sensor configured to measure the remaining charge on such batteries. For example, the battery sensor may measure a battery voltage or battery current. The digital display may indicate a remaining charge on the battery, such as a low charge warning light, a charge bar, or charge percentage. The indication of the remaining charge on the battery may be beneficial for preventing the battery charge to completely run out or limiting running of the trolling motor when the battery charge is low.

In some example embodiments, the trolling motor may have a plurality of operating modes, such as manual mode, anchor mode, autopilot mode, speed lock mode, or a heading lock mode. In some example embodiments, the digital display may also be configured to indicate the current operating mode of the trolling motor.

An example embodiment of the present invention includes a trolling motor assembly configured for attachment to a watercraft. The trolling motor assembly comprises a shaft defining a first end and a second end. The trolling motor assembly further includes a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly comprises a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft. The trolling motor assembly further includes a digital display configured to display the direction of the trolling motor housing relative to the watercraft. The trolling motor assembly further includes a processor and a memory including computer program code. The computer program code is configured to, when executed, cause the processor to receive position data from the position sensor; generate display data based on the position data, wherein the display data includes the direction of the trolling motor housing; and cause the display data to be displayed on the digital display. The digital display is attached to and positioned at least partially within the main housing. The digital display is configured to display the display data so as to provide an indication of a current direction of the trolling motor housing relative to the watercraft.

In some embodiments, the trolling motor assembly further comprises a speed sensor configured to measure the speed of the watercraft through the body of water. The computer program code is further configured to, when executed, cause the processor to receive speed data from the speed sensor, and the display data is further based on the speed data.

In some embodiments, the trolling motor assembly further comprises a motor sensor configured to measure the output of the trolling motor. The computer program code is further configured to, when executed, cause the processor to receive motor data from the speed sensor, and the display data is further based on the motor data. In some embodiments, the motor data comprises at least one of motor current, motor speed, or a percent of a maximum motor output.

In some embodiments, the trolling motor assembly further comprises a battery sensor configured to measure the charge remaining on a battery. The battery is electrically connected to and supplies power to the trolling motor. The computer program code is further configured to, when executed, cause the processor to receive charge data from the battery sensor, and the display data is further based on the charge data.

In some embodiments, the computer program code is further configured to, when executed, cause the processor to receive an indication of a trolling motor mode from among a plurality of trolling motor modes, and the display data further comprises a mode indicator that provides an indication of a current trolling motor mode. In some embodiments, the plurality of trolling motor modes includes at least two of a manual mode, an anchor mode, an autopilot mode, a speed lock mode, or a heading lock mode.

In some embodiments, the digital display is glare or heat resistant.

In some embodiments, the digital display is a liquid crystal display (LCD) display.

In some embodiments, the processor and the memory are contained within the main housing.

In some embodiments, the trolling motor assembly further comprises a navigation system that includes the at least one location sensor. The computer program code is further configured to, when executed, cause the one or more processors to generate at least one of a waypoint distinct from a location of the watercraft or a route associated with the location of the watercraft. In some embodiments, the trolling motor assembly further comprises an autopilot. The autopilot is configured to operate the trolling motor to propel the watercraft to the waypoint or along the route.

In some embodiments, the digital display comprises a first portion and a second portion. The first portion comprises a direction indicator indicating direction of the trolling motor relative to the vessel. In some embodiments, the direction indicator comprises a digital dial disposed about a circumference of the second portion. In some embodiments, the second portion includes a mode indicator, a battery indicator, a speed indicator, a motor indicator, or text.

In another example embodiment, a system is provided. The system comprises a trolling motor assembly configured for attachment to a watercraft. The trolling motor assembly comprises a shaft defining a first end and a second end. The trolling motor assembly further includes a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft. The trolling motor assembly further includes a digital display configured to display the direction of the trolling motor housing. The system further includes a processor and a memory including computer program code. The computer program code is configured to, when executed, cause the processor to receive position data from the position sensor; generate display data based on the position data, wherein the display data includes the direction of the trolling motor housing relative to the watercraft; and cause the display data to be displayed on the digital display. The digital display is integrated with the main housing and configured to display the display data so as to provide an indication of a current direction of the trolling motor housing relative to the watercraft.

In some embodiments, the system further comprises a speed sensor configured to measure the speed of the watercraft through the body of water. The computer program code is further configured to, when executed, cause the processor to receive speed data from the speed sensor, and the display data is further based on the speed data.

In some embodiments, the system further comprises a motor sensor configured to measure the output of the trolling motor. The computer program code is further configured to, when executed, cause the processor to receive motor data from the speed sensor, and the display data is further based on the motor data.

In some embodiments, the system further comprises a battery sensor configured to measure the charge remaining on a battery. The battery is electrically connected to and supplies power to the trolling motor. The computer program code is further configured to, when executed, cause the processor to receive charge data from the battery sensor, and the display data is further based on the charge data.

In yet another embodiment, a method for displaying a current direction of a trolling motor housing relative to a watercraft is provided. The method comprises providing a trolling motor assembly configured for attachment to the watercraft. The trolling motor assembly comprises a shaft defining a first end and a second end and a trolling motor at least partially contained within the trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft and a digital display configured to display the direction of the trolling motor housing relative to the watercraft. The method further includes receiving, at a processor, position data from the position sensor; generating, via the processor, display data based on the position data, wherein the display data includes the direction of the trolling motor housing; and causing the display data to be displayed on the digital display. The digital display is integrated with the main housing and configured to display the display data so as to provide an indication of a current direction of the trolling motor housing relative to the watercraft.

In yet another embodiment, a trolling motor assembly configured for attachment to a watercraft is provided. The trolling motor assembly comprises a shaft defining a first end and a second end and a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft. The trolling motor assembly further includes a digital display, a processor, and a memory including computer program code. The computer program code is configured to, when executed, cause the processor to receive position data from the position sensor; compare the position data to a predetermined display orientation; generate display data; and cause the display data to be displayed on the digital display in a predetermined direction relative to the watercraft based on the comparison of the position data to the predetermined display orientation such that the display data is presented in a direction that appears right side up to a user on the watercraft while the trolling motor housing rotates.

In some embodiments, the trolling motor assembly further comprises a speed sensor configured to measure the speed of the watercraft through the body of water. The computer program code is further configured to, when executed, cause the processor to receive speed data from the speed sensor, and the display data is based on the speed data.

In some embodiments, the trolling motor assembly further comprises a motor sensor configured to measure the output of the trolling motor. The computer program code is further configured to, when executed, cause the processor to receive motor data from the speed sensor, and the display data is based on the motor data. In some embodiments, the motor data comprises at least one of motor current, motor speed, or a percent of a maximum motor output.

In some embodiments, the trolling motor assembly further comprises a battery sensor configured to measure the charge remaining on a battery. The battery is electrically connected to and supplies power to the trolling motor. The computer program code is further configured to, when executed, cause the processor to receive charge data from the battery sensor, and the display data is based on the charge data.

In some embodiments, the computer program code is further configured to, when executed, cause the processor to receive an indication of a trolling motor mode from among a plurality of trolling motor modes, and the display data comprises a mode indicator that provides an indication of a current trolling motor mode.

In some embodiments, the digital display is glare or heat resistant.

In some embodiments, the digital display is a liquid crystal display (LCD) display In some embodiments, the processor and the memory are contained within the main housing.

In some embodiments, the digital display comprises a first portion and a second portion, wherein the first portion comprises a direction indicator indicating a direction of the trolling motor relative to the vessel. In some embodiments, the direction indicator comprises a digital dial disposed about a circumference of the second portion. In some embodiments, the second portion includes a mode indicator, a battery indicator, a speed indicator, a motor indicator, or text.

In some embodiments, the display data comprises sonar data.

In yet another embodiment, a system is provided. The system comprises a trolling motor assembly configured for attachment to a watercraft. The trolling motor assembly comprises a shaft defining a first end and a second end and a trolling motor at least partially contained within a trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft. The trolling motor assembly further includes a digital display, a processor, and a memory including computer program code. The computer program code is configured to, when executed, cause the processor to receive position data from the position sensor; compare the position data to a predetermined display orientation; generate display data; and cause the display data to be displayed on the digital display in a predetermined direction relative to the watercraft based on the comparison of the position data to the predetermined display orientation such that the display data is presented in a direction that appears right side up to a user on the watercraft.

In some embodiments, the system further comprises a motor sensor configured to measure the output of the trolling motor. The computer program code is further configured to, when executed, cause the processor to receive motor data from the speed sensor, and the display data is based on the motor data.

In some embodiments, the system further comprises a battery sensor configured to measure the charge remaining on a battery. The battery is electrically connected to and supplies power to the trolling motor. The computer program code is further configured to, when executed, cause the processor to receive charge data from the battery sensor, and the display data is based on the charge data.

In some embodiments, the digital display is glare or heat resistant.

In some embodiments, the digital display comprises a first portion and a second portion, wherein the first portion comprises a direction indicator indicating direction of the trolling motor relative to the vessel. The direction indicator comprises a digital dial disposed about a circumference of the second portion.

In some embodiments, the display data comprises sonar data.

In yet another example embodiment, a method is provided. The method comprises providing a trolling motor assembly configured for attachment to the watercraft. The trolling motor assembly comprises a shaft defining a first end and a second end and a trolling motor at least partially contained within the trolling motor housing. The trolling motor housing is attached to the second end of the shaft. When the trolling motor assembly is attached to the watercraft and the trolling motor housing is submerged in a body of water, the trolling motor, when operating, is configured to propel the watercraft to travel along the body of water. The trolling motor assembly further includes a main housing connected to the shaft proximate the first end of the shaft. The main housing is configured to be positioned out of the body of water when the trolling motor assembly is attached to the watercraft and the trolling motor housing is submerged in the body of water. The trolling motor assembly further includes a position sensor configured to determine the direction of the trolling motor housing relative to the watercraft and a digital display. The method further includes receiving, at a processor, position data from the position sensor; comparing the position data to a predetermined display orientation; generating display data; and causing the display data to be displayed on the digital display in a predetermined direction relative to the watercraft based on the comparison of the position data to the predetermined display orientation such that the display data is presented in a direction that appears right side up to a user on the watercraft while the trolling motor housing rotates.

BRIEF DESCRIPTION OF THE DRAWINGS

Figure 1:
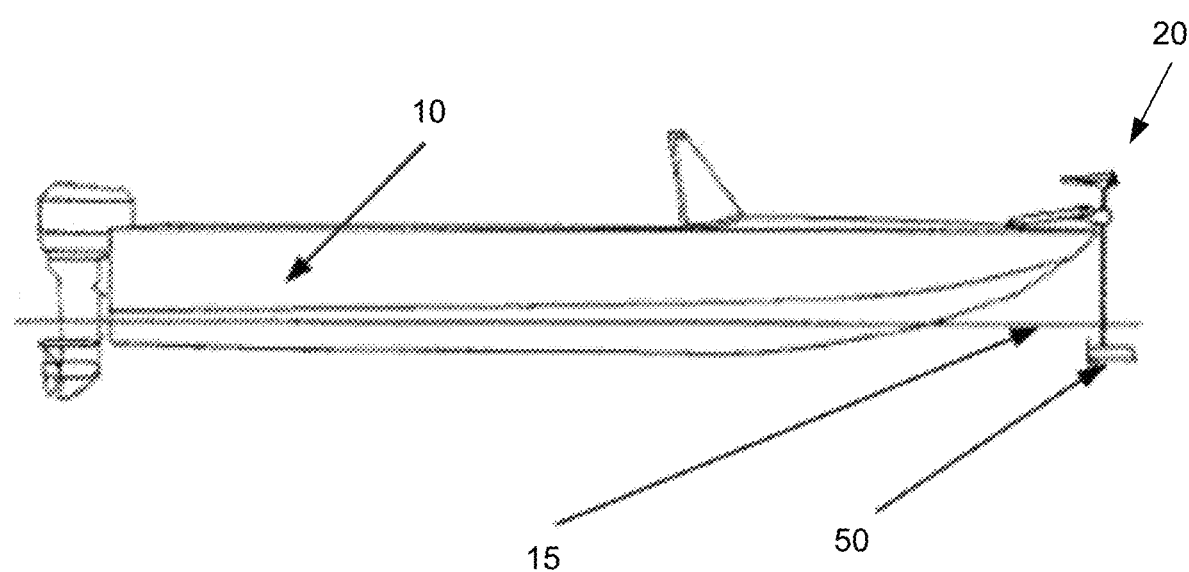
Figure 2:
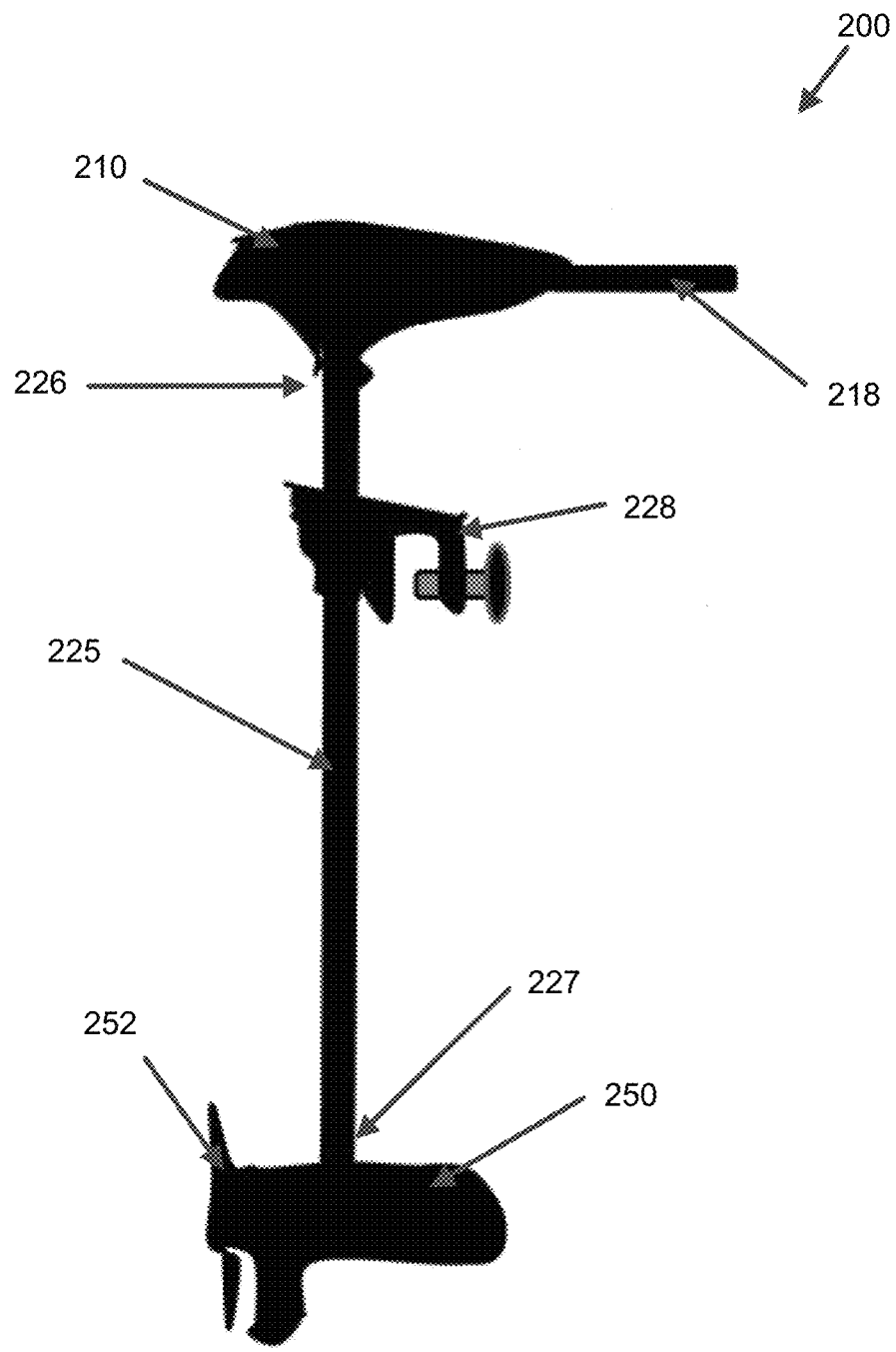
Figure 3:
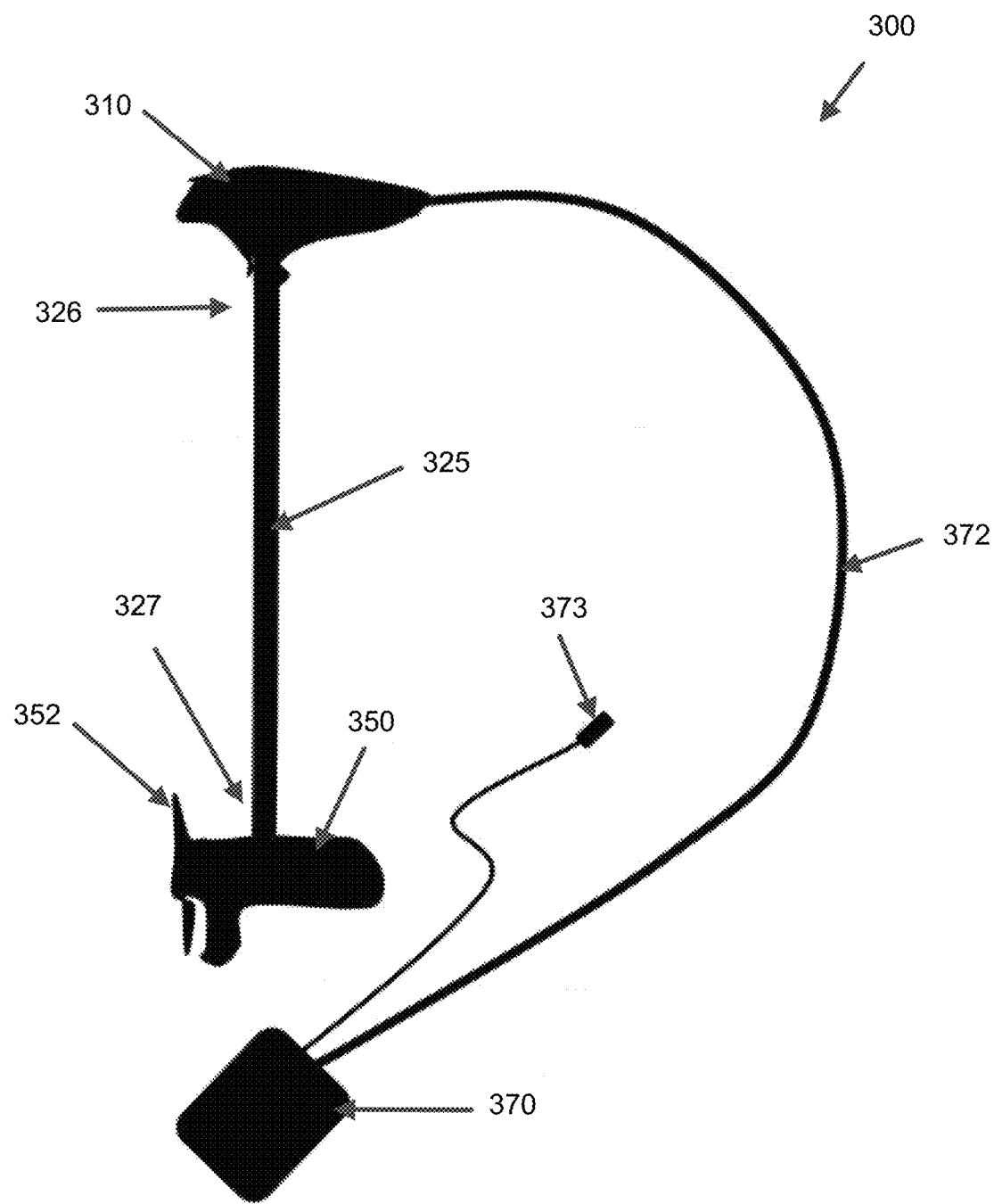
Figure 4:
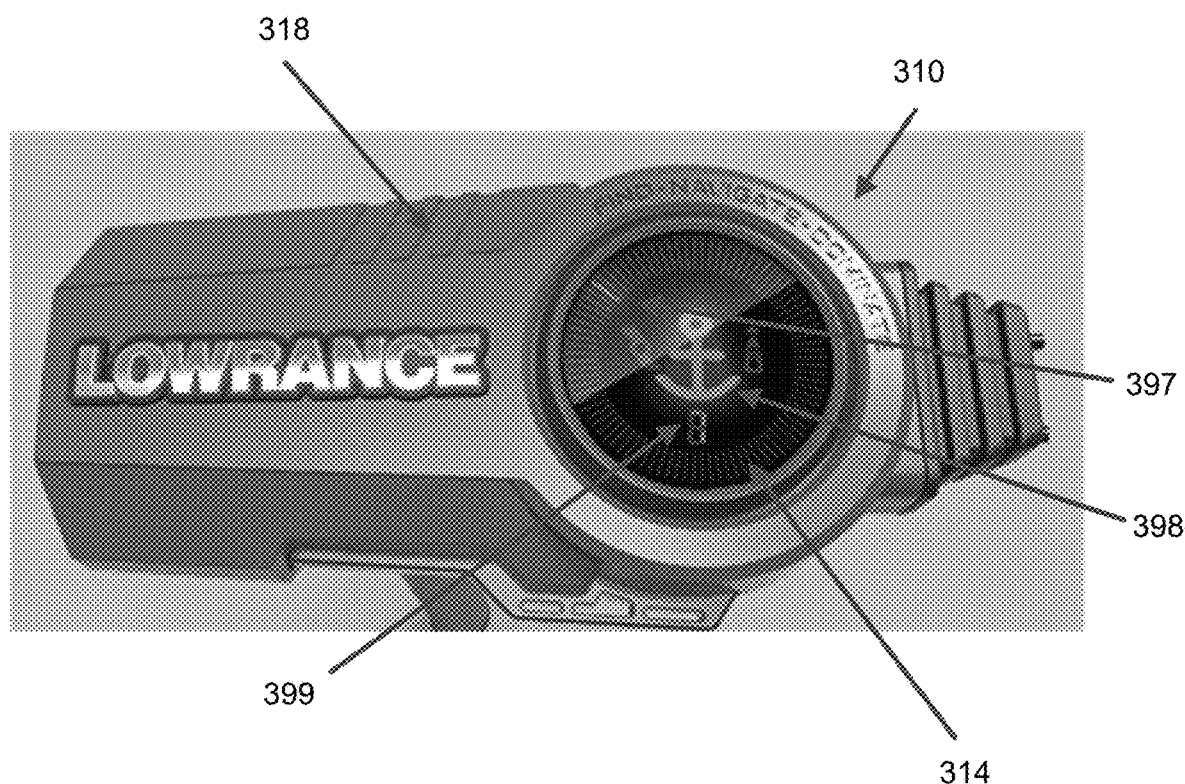
Figure 6A:
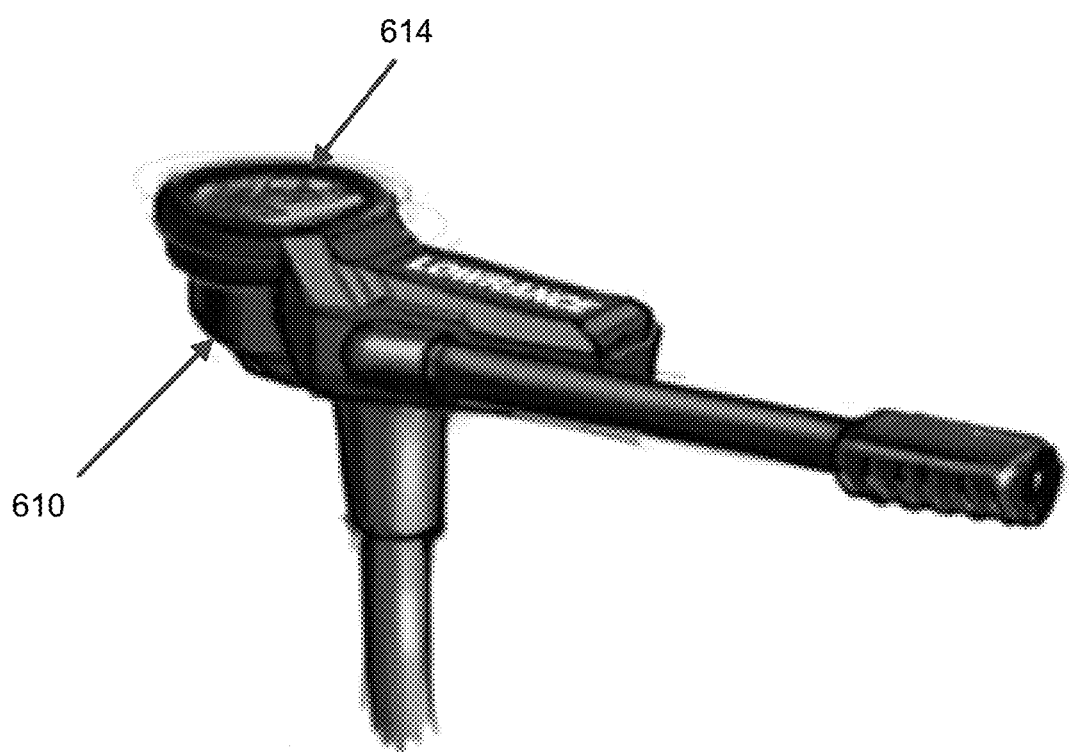
Figure 6B:
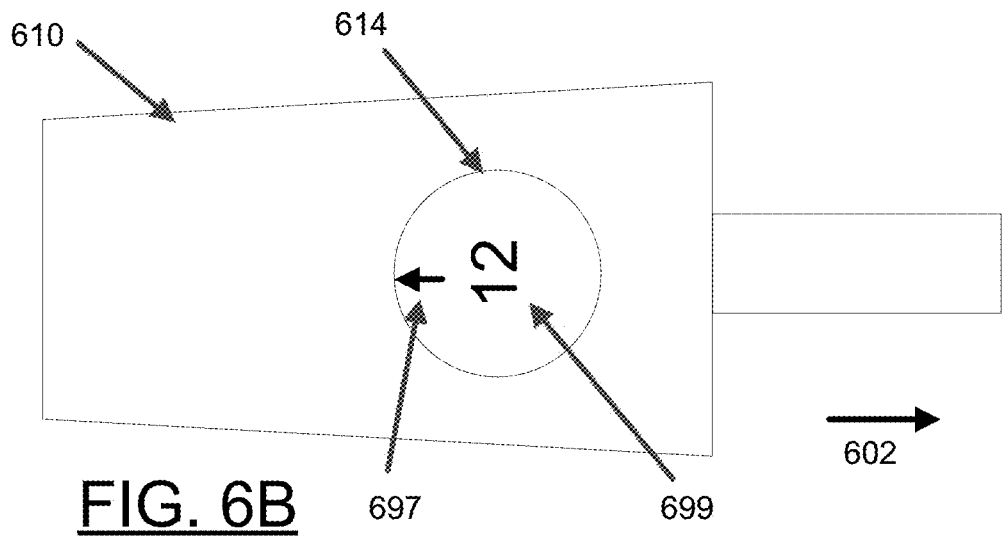
Figure 6C:
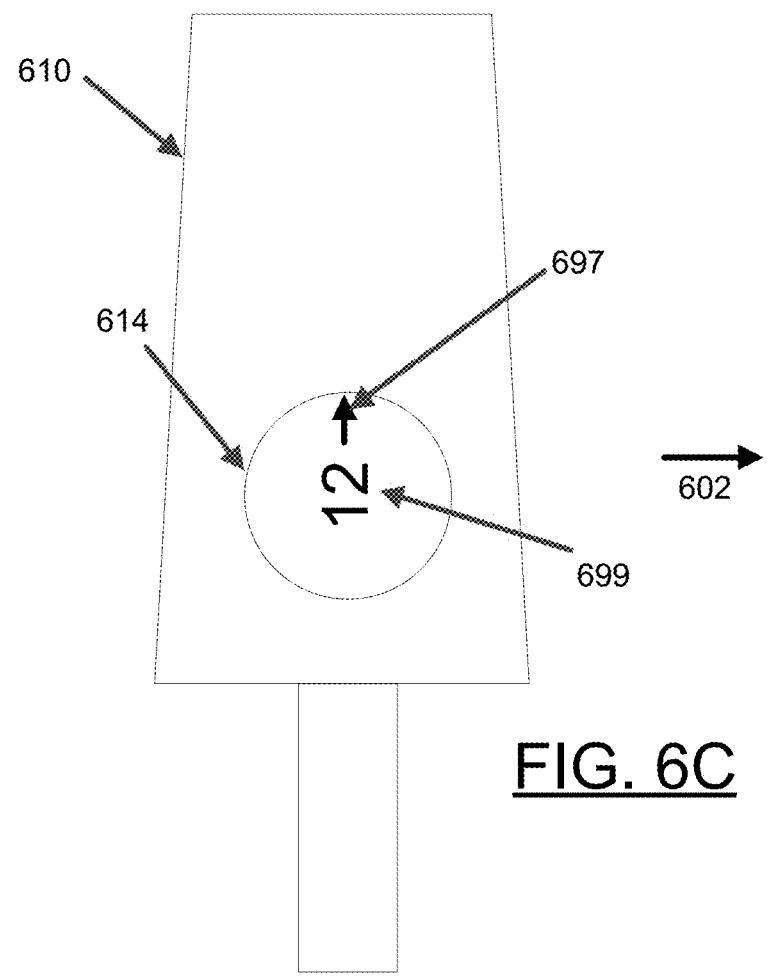
Figure 7:
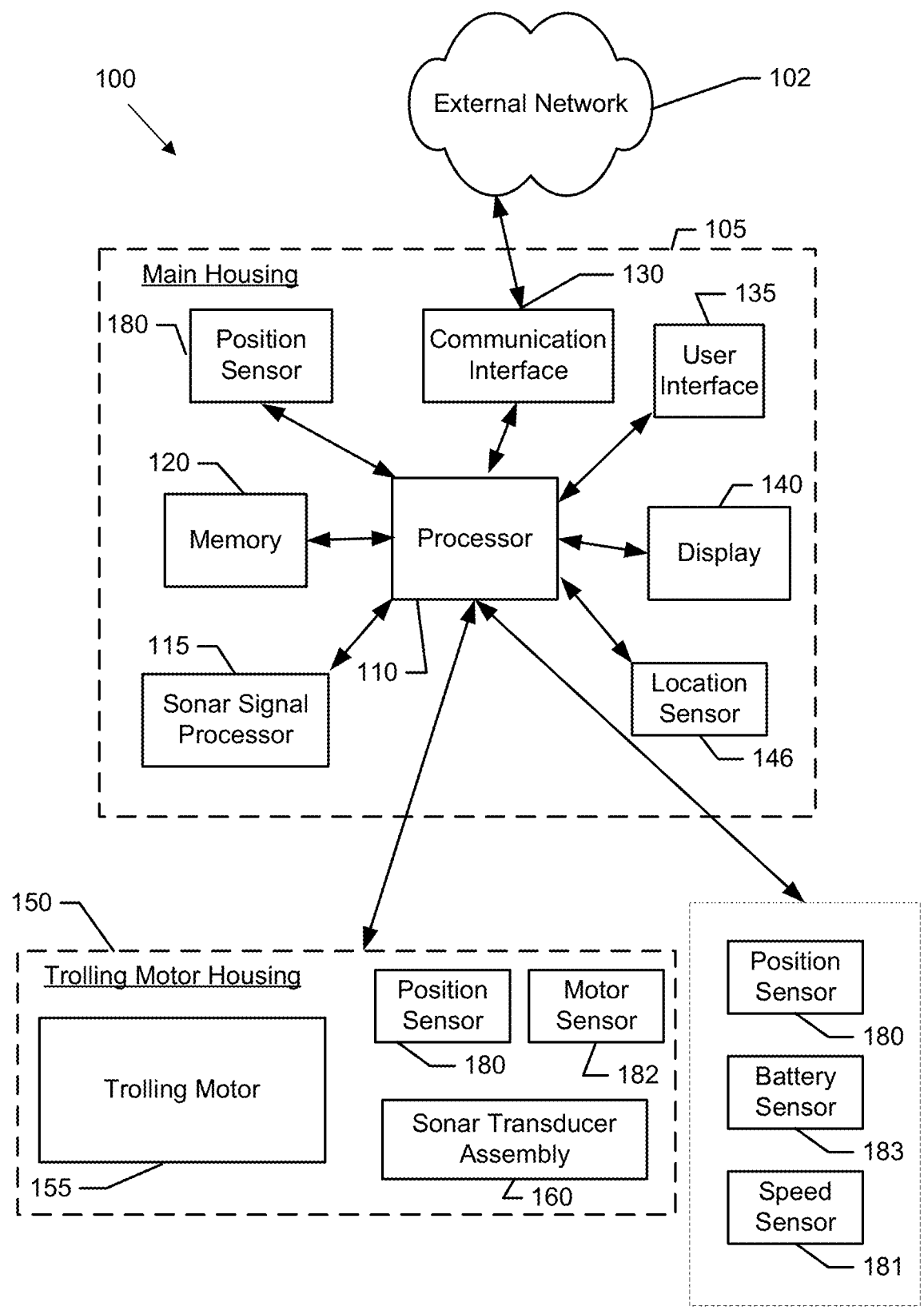
Figure 8:
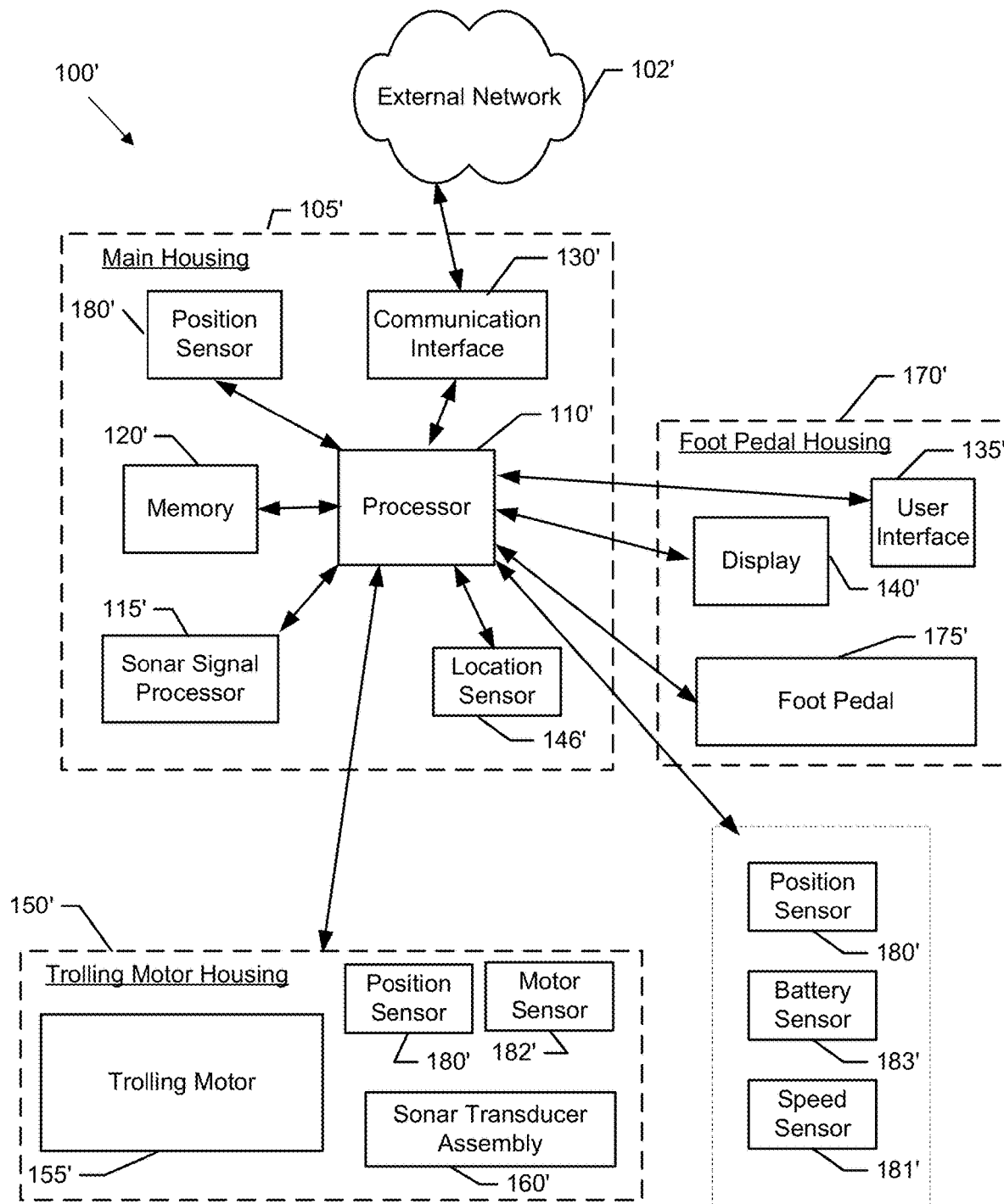

Having thus described the invention in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor assembly configured for hand-control, in accordance with some embodiments discussed herein;

FIG. 3 shows another the example trolling motor assembly that is configured for control via a foot pedal, in accordance with some embodiments discussed herein;

FIG. 4 shows an example main housing for a trolling motor assembly, wherein a digital display is integrated into the main housing, in accordance with some embodiments discussed herein;

FIGS. 5A and 5B show example digital displays, in accordance with some embodiments discussed herein;

FIGS. 6A-6C show example steerable trolling motors wherein a digital display is integrated into the main housing, in accordance with some example embodiments discussed herein;

FIG. 7 shows a block diagram illustrating a marine system including an example trolling motor assembly, in accordance with some embodiments discussed herein;

FIG. 8 shows a block diagram illustrating a marine system including another example trolling motor assembly, in accordance with some embodiments discussed herein; and FIG. 9 illustrates a flowchart of an example method for processing marine data and generating an image according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Some embodiments of the present invention provide trolling motor assemblies with a position sensor and digital display. Such example embodiments enable an indication of the direction of the trolling motor without complicated mechanical linkages, which may be subject to failure or may be difficult to waterproof. Additionally, the digital display may be used to provide other information relevant to the trolling motor, such as speed, motor output, battery charge, operating mode, or the like. This may reduce the need for an operator to reference other devices, which may be in locations remote to the trolling motor, to determine the additional information.

FIG. 1 illustrates an example watercraft 10 on a body of water 15. The watercraft 10 has a trolling motor assembly 20 attached to its front, with a trolling motor 50 submerged in the body of water. The trolling motor can be used as a propulsion system to cause the watercraft to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may be the primary propulsion system for the watercraft 10.

Depending on the design, a trolling motor may be gas-powered or electric. Moreover, steering may be accomplished manually via hand control, via foot control, or even through use of a remote control. Additionally, in some cases, an autopilot may operate the trolling motor autonomously.

FIG. 2 illustrates an example trolling motor assembly 200 that is electric and hand controlled (e.g., trolling motor assembly 100 in FIG. 7). The trolling motor assembly 200 includes a shaft 225 defining a first end 226 and a second end 227, a trolling motor housing 250 and a main housing 210.

The trolling motor housing 250 is attached to the second end 227 of the shaft 225 and at least partially contains a trolling motor that connects to a propeller 252. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (160 in FIG. 7) and/or other sensors.

The main housing 210 is connected to the shaft 225 proximate the first end 226 of the shaft 225 and includes a hand control rod 218 that enables control of the trolling motor by a user (e.g., through angular rotation). As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 210 may be configured to house components of the trolling motor assembly, such as may be used for processing marine or sensor data and/or controlling operation of the trolling motor, among other things. For example, with reference to FIG. 7, depending on the configuration and features of the trolling motor assembly, the main housing 210 may contain, for example, one or more of a processor 110, sonar signal processor 115, memory 120, location sensor 146, position sensor 180, communication interface 130, user interface 135, or a display 140.

The trolling motor assembly 200 may also include an attachment device 228 (e.g., a clamp or other attachment means) to enable connection or attachment of the trolling motor assembly to the watercraft. Depending on the attachment device used, the trolling motor assembly may be configured for rotational movement relative to the watercraft, including, for example, 360 degree rotational movement.

FIG. 3 illustrates an example trolling motor assembly 300 that is electric and controlled with a foot pedal (e.g., trolling motor assembly 100' in FIG. 8). The trolling motor assembly 300 includes a shaft 325 defining a first end 326 and a second end 327, a trolling motor housing 350 and a main housing 310.

The trolling motor housing 350 is attached to the second end 327 of the shaft 325 and at least partially contains a trolling motor that connects to a propeller 352. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (160' in FIG. 8) and/or other sensors.

The main housing 310 is connected proximate the first end 326 of the shaft 325. As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 310 may be configured to house components of the trolling motor assembly, such as may be used for processing marine data and/or controlling operation of the trolling motor, among other things. For example, with reference to FIG. 8, depending on the configuration and features of the trolling motor assembly, the main housing 310 may contain, for example, one or more of a processor 110', sonar signal processor 115', memory 120', location sensor 146', position sensor 180', or communication interface 130'.

The trolling motor assembly 300 also includes a foot pedal housing 370 that is electrically connected to the trolling motor (such as through the main housing 310) using the cable 372. The foot pedal housing 370 contains a foot pedal (e.g., 175' in FIG. 8) that enables a user to steer and/or otherwise operate the trolling motor to control the direction and speed of travel of the watercraft. The foot pedal housing 370 may also contain, in accordance with some embodiments, a display (140' in FIG. 8) and/or user interface (135' in FIG. 8). Further, depending on the configuration of the foot pedal, the foot pedal housing 370 (and/or main housing 310) may comprise an electrical plug 373 that can be connected to an external power source of powering the various components of the trolling motor assembly 300.

The trolling motor assembly 300 may also include an attachment device, such as a clamp, mount, etc., (not shown) to enable connection or attachment of the trolling motor assembly to the watercraft. Depending on the attachment device used, the trolling motor assembly may be configured for rotational movement relative to the watercraft, including, for example, 360 degree rotational movement.

As detailed herein, some embodiments of the present invention provide a digital display and/or user interface with a trolling motor assembly. In this regard, depending on the configuration, the display and/or user interface may be integrated into one or more components of the trolling motor assembly to form a single assembly that provides the user with access or visibility to many different features that are pertinent to the trolling motor and/or watercraft.

FIG. 4 illustrates an example main housing 310 for a trolling motor assembly, wherein the display and/or user interface 314 is integrated with the main housing 310. In particular, the display and/or user interface 314 is contained within the physical structure 318 of the main housing 310. In some embodiments, the display and/or user interface 314 is configured to display data. In the depicted embodiment, the screen of the display and/or user interface 314 is presenting an indication 397 of the direction of the trolling motor housing 350 relative to the watercraft 10, an operating mode 398, and speed data 399. FIG. 7 illustrates a block diagram of an example trolling motor assembly 100 with a display 140 and user interface 135 integrated within the main housing 105.

In some embodiments, the display and/or user interface 314 may be a screen that is configured to merely present images and not receive user input. In other embodiments, the display and/or user interface 314 may be a user interface such that it is configured to receive user input in some form. For example, the user interface may include one or more buttons (not shown) that enable user input. The display and/or user interface 314 may include an indication of the direction of the trolling motor housing 350 relative to the watercraft, an operation mode, or other relevant information, as discussed below.

The display and/or user interface 314 may include a digital display such as a liquid crystal (LCD) display, a light emitting diode (LED) display, or the like. In some example embodiments, the digital display may be glare resistant and/or heat resistant. For example, the digital display may include an anti-glare coating, utilizing diffusion mechanisms, a polarized lens, or a heat resistant coating.

Although, depicted in FIG. 4 as integrated into the main housing 310, the display and/or user interface may be separately attached or may, additionally or alternatively, be integrated into or separately attached to the foot pedal housing 370. The ability to include the display and/or user interface 314 in either, or both of, the main housing 310 and the foot peddle housing 370 provides greater design flexibility.

Turning to FIG. 5A and referencing FIGS. 7 and 8, some example embodiments include an example display 140, 140' and/or user interface 135, 135'. As discussed above, the display 140, 140' and/or user interface 135, 135' may include a digital display 400. The digital display 400 may include a first portion 402 configured to display various trolling motor information and a second portion 404 configured to display a direction indicator indicative of the direction of the trolling motor housing 150, 150' (e.g., relative to the watercraft 10 when the trolling motor is so mounted/attached). In an example embodiment, the second portion 404 may be disposed about a circumference, or periphery, of the first portion 402.

In an example embodiment, the second portion 404 may include a plurality of display segments 406. In some example embodiments, each of the display segments 406 may include one or more LCD segments or LEDs. The trolling motor assembly 100, 100' may cause one or more of the display segments 406 of the second portion to energize or de-energize to provide an indication of a direction of the trolling motor housing 150, 150' (e.g., similar to shown as 397 in FIG. 4).

In operation, a position sensor 180, 180' may be operably coupled to either the shaft 225, 325 or steering mechanism, such that the position sensor 180, 180' measures the rotational change in position of the trolling motor housing 150, 150' as the trolling motor is turned. The position sensor 180, 180' may be a magnetic sensor, a light sensor, mechanical sensor, or the like. The position sensor 180, 180' may be disposed within the main housing 210, 310 of the trolling motor housing 150, 150', or any other suitable location.

In some example embodiments, the user may calibrate the position sensor 180, 180' by setting the trolling motor housing 150, 150' to a predetermined position/direction, such as straight forward or straight back relative to the watercraft 10 and set a reference position/direction. The position sensor 180, 180' may then measure the difference between the reference position and the current position and/or determine a change in position of the trolling motor relative to the reference position/direction. A processor 110, 110' of the trolling motor assembly 100, 100', may receive position data from the position sensor 180, 180' for the reference position and store the reference position data in a memory 120, 120' as reference position data. The trolling motor assembly 100, 100', or more particularly, the processor 110, 110' may receive position data from the position sensor 180, 180' and generate display data indicative of the direction of the trolling motor housing 150, 150' relative to the watercraft 10. The processor 110, 110' may compare the position data to the reference position data to determine the direction of the trolling motor housing 150, 150', such as relative to the reference direction and/or the watercraft. The processor 110, 110' may then generate display data based on the position data, such as determining one or more display segments 406, corresponding to the direction of the trolling motor housing 150, 150', to energize or de-energize in the second portion 404 of the digital display 400. The processor 110, 110' may then transmit a control signal to the digital display 400 to cause the display data to be displayed on the digital display, e.g. energizing or de-energizing the one or more display segments 406.

In addition to the direction of the trolling motor housing 150, 150', the digital display 400 may also provide other relevant information regarding the trolling motor assembly 100, 100'. In some example embodiments, the trolling motor assembly may be configured for the digital display to provide one or more of speed, motor output, battery charge, operating condition, or the like.

In an example embodiment, the trolling motor assembly 100, 100' may include a speed sensor 181, 181', such as an electromagnetic speed sensor, paddle wheel speed sensor, or the like. The speed sensor 181, 181' may be configured to measure the speed of the watercraft 10 through the water. The processor 110, 110' may receive speed data from the speed sensor 181, 181' and generate additional display data indicative of the speed of the watercraft 10 through the water. The speed data may be displayed, such as in text format on the first portion 402 of the digital display 400. The speed data may be displayed in any relevant unit, such as miles per hour, kilometers per hour, feet per minute, or the like. In some instances, a unit identifier, such as a plurality of LEDs, may be provided in association with the display 408 (although shown in normal text, in some embodiments, a seven digit display may be utilized, such as shown in FIG. 4). The processor 110, 110' may cause an LED associated with the appropriate unit for the speed data to be illuminated.

In some example embodiments, the trolling motor assembly 100, 100' may include a motor sensor 182, 182'. The motor sensor may be a voltage sensor, a rotation per minute (RPM) sensor, a current sensor, or other suitable sensor to measure the output of the trolling motor 155, 155'. The processor 110, 110' may receive the motor data from the motor sensor 182, 182' and determine a motor output. In an example embodiment, the motor data may be compared to a data table (which may be stored in memory 120, 120') to determine a motor output, such as a percentage of maximum motor output. The processor 110, 110' may generate additional display data indicative of the motor output and cause the display data to be displayed in the first portion 402 of the digital display 400. For example, the motor data may be the measured voltage, current, or RPM displayed in the display 408, a percentage of the maximum motor output displayed in the display 408 or graphically in a segment bar, a high or low motor output warning light, or other suitable display. The segment bar may include a plurality of display segments which may be energized or de-energized to indicate a corresponding proportion of the maximum output of the motor.

In some example embodiments, the trolling motor assembly 100, 100' includes a battery sensor 183, 183'. The battery sensor 183, 183' may include a current sensor or voltage sensor configured to measure the current charge of a battery power supply of the trolling motor assembly 100. The battery sensor 183, 183' may be configured to measure individual battery cells or measure a battery bank. The processor 110, 110' may receive battery data from the battery sensor 183, 183' and determine the remaining charge on the battery. In an example embodiment, the voltage or current measured by the battery sensor 183, 183' may be compared to a reference value or data table, stored in memory 120, 120', to determine the remaining charge on the battery. The processor 110, 110' may generate display data including the battery data and cause the battery data to be displayed in the first portion 402 of the digital display 400. For example, the battery data may be the measured voltage or current displayed in the display 408, a percentage of the maximum battery charge displayed in the display 408 or graphically in a segment bar, a high or low battery charge warning light, or other suitable display. The segment bar may include a plurality of display segments which may be energized or de-energized to indicate a corresponding proportion of the maximum charge of the battery.

In some example embodiment, the trolling motor assembly 100, 100' may include a plurality of operating modes, such as a manual mode, an anchor mode, an autopilot mode, a speed lock mode, a heading lock mode, or the like. The processor 100, 100' may receive an indication of the current operating mode and generate display data indicative of the current operating mode. In an example embodiment, the mode may be represented by a number, letter, or character value displayed, such as on the seven segment display. Additionally or alternatively, each mode may be represented by a mode icon. For example, a manual mode may be represented by a manual mode icon 410, such as a propeller, a speed lock mode may be represented by a speed lock icon 412, such as an vessel outline with arrow, an anchor lock mode may be represented by an anchor lock icon 414, such as an anchor, and a heading lock mode may be represented by a heading lock icon 416, such as a vessel outline with a directional indicator.

In addition to the mode icons, other informational icons may also be provided. In an example embodiment, the digital display 400 may include one or more of a speed icon, a battery icon 418, and a motor icon 420. These additional icons may be used to indicate the type of data displayed on the seven segment display. For example, no icon may be indicated when speed data is displayed, however, a battery icon 418 or motor icon 420 may be displayed to indicate battery data or motor data is being displayed, respectively.

In some embodiments, the trolling motor assembly 100, 100' may be configured to determine the location of the watercraft, such as through location sensor 146, 146'. The trolling motor assembly 100, 100' may comprise, or be associated with, a navigation system that includes the location sensor 146, 146'. In such a regard, the processor 110, 110' may be configured to act as a navigation system. For example, the processor 110, 110' may generate at least one waypoint that is distinct from the location of the watercraft. Additionally or alternatively, the processor may generate one or more routes associated with the watercraft. The location of the vessel, waypoints, and/or routes may be displayed on a navigation chart on a display remote from the trolling motor assembly 100, 100'.

In some embodiments, the trolling motor assembly 100, 100' may comprise an autopilot that is configured to operate the trolling motor to propel the watercraft in a direction and at a speed. In some embodiments, the autopilot may direct the watercraft to a waypoint (e.g., a latitude and longitude coordinate). Additionally or alternatively, the autopilot may be configured to direct the watercraft along a route, such as in conjunction with the navigation system. Further, additional autopilot features (e.g., anchoring) are also contemplated. In some example embodiment, the processor 110, 110' may receive an indication of the trolling motor operating condition being the autopilot mode. The processor 110, 110' may generate display data based on the autopilot operating mode and cause an indication of the autopilot operating mode to be displayed on the digital display 400 in the first portion 402, such as an autopilot icon 422.

In some embodiments, the trolling motor assembly 100, 100' may comprise a sonar system including a sonar transducer assembly 160, 160'. The sonar transducer assembly 160, 160' may be housed in the trolling motor housing 150, 150' and configured to gather sonar data from the underwater environment relative to the watercraft. Accordingly, the processor 110, 110' may be configured to receive an indication of operation of the sonar transducer assembly 160, 160'. The processor 110, 110' may generate additional display data indicative of the operation of the sonar transducer and cause the display data to be displayed on the digital display 400. For example, a sonar icon (not shown) may be energized to indicate that the sonar transducer is operating.

Additionally or alternatively, the digital display 400 (e.g., within the first portion) may be configured to display sonar images, such as depicted in FIG. 5B. The processor 110, 110' may be configured to receive sonar data from the sonar transducer assembly 160, 160' and generate one or more sonar images based on the sonar data, e.g. sonar returns. The processor 110, 110' may then cause the one or more sonar images to be displayed on the digital display 400, in real time or near real time, as the watercraft 10 traverses the body of water. As such, the display data described above may include the one or more sonar images.

In some embodiments, the trolling motor assembly 100, 100' may be configured such that the one or more processors electrically control the trolling motor in addition to the features described herein.

The digital display 400 may be fixed relative to the main housing 310 or foot pedal housing 370, such as when mounted in a fixed head trolling motor 200 or in a foot pedal, as described above. Alternatively, a rotating head trolling motor, such as an example hand steer trolling motor depicted in FIG. 6A, may include a rotating digital display (although non-hand steer trolling motors may also include a rotating digital display). The rotating digital display may physically rotate relative to the main housing, or be configured to rotate the display data to maintain the display data oriented in a predetermined direction relative to the watercraft 10. Turning to FIGS. 6B and 6C, a main housing 610 of the trolling motor is depicted including a digital display 614. A watercraft orientation is depicted by arrow 602. The display data, here speed data 699, is oriented to be readable by a user positioned on the watercraft 10. The display data is rendered on the digital display 614 in a predetermined display orientation relative to the watercraft orientation 602 regardless of the orientation of the main housing 610.

In a first example embodiment, the digital display 614 may be in a fixed position, relative to the watercraft 10, and the main housing 610 may be configured to rotate about the digital display 614. For example, the digital display 614 may be directly, or indirectly, coupled to a trolling motor mount connecting the trolling motor to the watercraft 10. The digital display 614 may, in some embodiments, operate substantially the same as the digital display 400 described above.

In a second example embodiment, the digital display is attached to the main housing 610 and rotates with the main housing. The processor 110, may receive the position data described above to determine the position of the trolling motor housing 350 relative to the watercraft 10, to determine a display orientation. The processor 110 may compare the position data to a predetermined display orientation and generate the display data based on the difference between the position data and the display orientation, such that the display data is displayed on the digital display in the desired orientation. For example, a display orientation may be set during the setting of the reference position, as discussed above in reference to FIG. 5A, such as a direction opposite the reference position. Alternatively, the user may set the display orientation separately, such as by rotating the main housing 610 until the digital display 614 is in the proper orientation and then entering a user input setting the display orientation. The processor 110 may store the display orientation in a memory 120 for future reference. The processor 110 may receive position data, speed data, and other types of data, as discussed above, and generate display data. The processor 110 may compare the position data to the predetermined display orientation. The processor 110 may determine a difference between a current position and the predetermined display orientation, which may be used to generate display data with the desired orientation. The processor 110 may then cause the display data to be displayed on the digital display 614 in the desired orientation.

In a third example embodiment, the digital display may be configured to rotate counter to the rotation of the main housing 610, thereby maintaining digital display in the desired orientation. For example, the digital display 614 or main housing 610 may include one or more circular contacts and the opposite may include drag contacts that maintain contact with their corresponding circular contact as the digital display 614 rotates. The circular contacts and drag contacts may provide data communication to the digital display 614. The digital display 614 may be caused to rotate by a mechanical linkage, such as gears disposed between the main housing 610 and the digital display 614. The gears may rotate the digital display 614 in the opposite direction at the same rate as the rotation of the main housing. Additionally or alternatively, an electric motor may be disposed within the main housing 610. The electric motor may rotate the digital display opposite the rotation of the main housing 610 based on the position data, described above.

Example System Architecture

FIG. 7 shows a block diagram of an example trolling motor assembly 100 capable for use with several embodiments of the present invention. As shown, the trolling motor assembly 100 may include a number of different modules or components, each of which may comprise any device or means embodied in either hardware, software, or a combination of hardware and software configured to perform one or more corresponding functions. For example, the trolling motor assembly 100 may include a main housing 105 and a trolling motor housing 150.

The trolling motor assembly 100 may also include one or more communications modules configured to communicate with one another in any of a number of different manners including, for example, via a network. In this regard, the communication interface (e.g., 130) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral, remote devices such as one or more wired or wireless multi-function displays may be connected to the trolling motor assembly 100.

The main housing 105 may include a processor 110, a sonar signal processor 115, a memory 120, a communication interface 130, a user interface 135, a display 140, one or more sensors (e.g., location sensor 146, a position sensor 180, a speed sensor 181, a motor sensor 182, and a battery sensor 183).

The processor 110 and/or a sonar signal processor 115 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein.

In this regard, the processor 110 may be configured to analyze electrical signals communicated thereto to provide display data to the display to indicate the direction of the trolling motor housing relative to the watercraft.

In some example embodiments, the processor 110 or sonar signal processor 115 may be configured to receive sonar data indicative of the size, location, shape, etc. of objects detected by the system 100. For example, the processor 110 may be configured to receive sonar return data and process the sonar return data to generate sonar image data for display to a user (e.g., on display 140 or a remote display).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 120 may be configured to store instructions, computer program code, marine data, such as sonar data, chart data, location/position data, and other data associated with the sonar system in a non-transitory computer readable medium for use, such as by the processor.

The communication interface 130 may be configured to enable connection to external systems (e.g., an external network 102). In this manner, the processor 110 may retrieve stored data from a remote, external server via the external network 102 in addition to or as an alternative to the onboard memory 120.

The location sensor 146 may be configured to determine the current position and/or location of the main housing 105. For example, the location sensor 146 may comprise a GPS, bottom contour, inertial navigation system, such as micro electro-mechanical sensor (MEMS), a ring laser gyroscope, or the like, or other location detection system.

The display 140 may be configured to display images and may include or otherwise be in communication with a user interface 135 configured to receive input from a user. The display 140 may be, for example, a conventional LCD (liquid crystal display), an LED display, or the like. The display may be integrated into the main housing 105. In some example embodiments, additional displays may also be included, such as a touch screen display, mobile device, or any other suitable display known in the art upon which images may be displayed.

In any of the embodiments, the display 140 may be configured to display an indication of the current direction of the trolling motor housing 150 relative to the watercraft. Additionally, the display may be configured to display other relevant trolling motor information including, but not limited to, speed data, motor data battery data, current operating mode, auto pilot, or the like.

The user interface 135 may include, for example, a keyboard, keypad, function keys, mouse, scrolling device, input/output ports, touch screen, or any other mechanism by which a user may interface with the system.

The position sensor 180 may be found in one or more of the main housing 105, the trolling motor housing 150, or remotely. In some embodiments, the position sensor 180 may be configured to determine a direction of which the trolling motor housing is facing. In some embodiments, the position sensor 180 may be operably coupled to either the shaft 225, 325 or steering mechanism, such that the position sensor 180 measures the rotational change in position of the trolling motor housing 150 as the trolling motor is turned. The position sensor 180 may be a magnetic sensor, a light sensor, mechanical sensor, or the like.

The trolling motor housing 150 may include a trolling motor 155, a sonar transducer assembly 160, and one or more other sensors (e.g., motor sensor 182, position sensor 180, water temperature, current, etc.), which may each be controlled through the processor 110 (such as detailed herein).

In an example embodiment, the trolling motor assembly 100 may include a speed sensor 181, such as an electromagnetic speed sensor, paddle wheel speed sensor, or the like. The speed sensor 181 may be configured to measure the speed of the watercraft 10 through the water.

In some example embodiments, the trolling motor assembly 100 may include a motor sensor 182. The motor sensor may be a voltage sensor, a rotation per minute (RPM) sensor, a current sensor or other suitable sensor to measure the output of the trolling motor 155.

In an example embodiment, the trolling motor assembly 100 includes a battery sensor 183. The battery sensor 183 may include a current sensor or voltage sensor configured to measure the current charge of a battery power supply of the trolling motor assembly 100.

FIG. 8 shows a block diagram of an example trolling motor assembly 100' capable for use with several embodiments of the present invention. The trolling motor assembly 100' is similar to and includes many of the same components as the trolling motor assembly 100 shown in FIG. 7. Notably, however, different from the trolling motor assembly 100 of FIG. 7, the trolling motor assembly 100' of FIG. 8 further includes a foot pedal housing 170' that includes a foot pedal 175', a display 140', and a user interface 135', which may each be connected to the processor 110 (such as detailed herein). In this regard, the depicted embodiment of FIG. 8 shows that the main housing 105' does not include the display 140' or user interface 135', as it is instead in the foot pedal housing 170' (though some embodiments contemplate inclusion of the display 140' and/or user interface 135' in the main housing).

Example Flowchart(s) and Operations

Embodiments of the present invention provide methods for receiving, processing, and displaying trolling motor related data. Various examples of the operations performed in accordance with embodiments of the present invention will now be provided with reference to FIG. 9.

FIG. 9 illustrates a flowchart according to an example method for receiving, processing, and displaying trolling motor related data according to an example embodiment. The operations illustrated in and described with respect to FIG. 9 may, for example, be performed by, with the assistance of, and/or under the control of one or more of the processor 110/110', sonar signal processor 115/115', memory 120/120', communication interface 130/130', user interface 135/135', location sensor 146/146', display 140/140', sonar transducer assembly 160/160', position sensor 180, 180', speed sensor 181, 181', motor sensor 182, 182', and/or battery sensor 183, 183'.

The method for receiving, processing, and displaying trolling motor related data depicted in FIG. 9 may include receiving position data from a position sensor at operation 502, generating display data based on at least the position data at operation 516, and causing the display data to be displayed on the digital display at operation 518.

In some embodiments, the method for receiving, processing, and displaying trolling motor related data may include additional, optional operations, and/or the operations described above may be modified or augmented. Some examples of modifications, optional operations, and augmentations are described below, as indicated by dashed lines, such as receiving speed data from a speed sensor at operation 504, receiving motor data from a motor sensor at operation 506, and receiving charge data from a battery sensor at operation 508. In an example embodiment, the method may include receiving sonar data from a sonar transducer assembly at operation 510 and generating one or more sonar images at operation 512. In some example embodiments, the method may include comparing the position data to a display orientation at operation 514. In some example embodiments, the method may also include generating at least one waypoint distinct from the location of the watercraft or the route associated with the location of the watercraft at operation 520.

FIG. 9 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120/120' and executed by, for example, the processor 110/110'. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A trolling motor assembly configured for attachment to a watercraft, wherein the trolling motor assembly comprises:
   a shaft defining a first end and a second end;
   a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
   a main housing connected to the shaft proximate the first end of the shaft, wherein the main housing is configured to be positioned out of the body of water when the trolling motor assembly is attached to the watercraft and the trolling motor housing is submerged in the body of water, wherein the main housing is rotationally fixed relative to the watercraft such that the main housing does not rotate with the trolling motor housing;
   a direction sensor configured to determine the direction of the trolling motor housing relative to the watercraft;
   a digital display configured to display the direction of the trolling motor housing relative to the watercraft;
   a processor; and
   a memory including computer program code configured to, when executed, cause the processor to:
      receive direction data from the direction sensor;
      generate display data based on the direction data, wherein the display data includes the direction of the trolling motor housing; and
      cause the display data to be displayed on the digital display,
   wherein the digital display is attached to and positioned at least partially within the main housing, wherein the digital display is configured to display the display data so as to provide an indication of a current direction of the trolling motor housing relative to the watercraft.

2. The trolling motor assembly of claim 1 further comprising:

a speed sensor configured to measure the speed of the watercraft through the body of water;
wherein the computer program code is further configured to, when executed, cause the processor to:
receive speed data from the speed sensor, and
wherein the display data is further based on the speed data.

3. The trolling motor assembly of claim 1 further comprising:
a motor sensor configured to measure the output of the trolling motor;
wherein the computer program code is further configured to, when executed, cause the processor to:
receive motor data from the speed sensor, and
wherein the display data is further based on the motor data.

4. The trolling motor assembly of claim 3, wherein the motor data comprises at least one of motor current, motor speed, or a percent of a maximum motor output.

5. The trolling motor assembly of claim 1 further comprising:
a battery sensor configured to measure the charge remaining on a battery, wherein the battery is electrically connected to and supplies power to the trolling motor; and
wherein the computer program code is further configured to, when executed, cause the processor to:
receive charge data from the battery sensor, and
wherein the display data is further based on the charge data.

6. The trolling motor assembly of claim 1, wherein the computer program code is further configured to, when executed, cause the processor to:
receive an indication of a trolling motor mode from among a plurality of trolling motor modes, and
wherein the display data further comprises a mode indicator that provides an indication of a current trolling motor mode.

7. The trolling motor assembly of claim 6, wherein the plurality of trolling motor modes includes at least two of a manual mode, an anchor mode, an autopilot mode, a speed lock mode, or a heading lock mode.

8. The trolling motor assembly of claim 1, wherein the digital display is glare or heat resistant.

9. The trolling motor assembly of claim 1 wherein the digital display is a liquid crystal display (LCD) display.

10. The trolling motor assembly of claim 1, wherein the processor and the memory are contained within the main housing.

11. The trolling motor assembly of claim 1 further comprising a navigation system that includes the at least one location sensor, and wherein the computer program code is further configured to, when executed, cause the one or more processors to:
generate at least one of a waypoint distinct from a location of the watercraft or a route associated with the location of the watercraft.

12. The trolling motor assembly of claim 11 further comprising an autopilot, wherein the autopilot is configured to operate the trolling motor to propel the watercraft to the waypoint or along the route.

13. The trolling motor assembly of claim 1, wherein the digital display comprises a first portion and a second portion, wherein the first portion comprises a direction indicator indicating direction of the trolling motor relative to the vessel.

14. The trolling motor assembly of claim 13, wherein the direction indicator comprises a digital dial disposed about a circumference of the second portion.

15. The trolling motor assembly of claim 13, wherein the second portion includes a mode indicator, a battery indicator, a speed indicator, a motor indicator, or text.

16. A system comprising:
a trolling motor assembly configured for attachment to a watercraft, wherein the trolling motor assembly comprises:
a shaft defining a first end and a second end;
a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
a main housing connected to the shaft proximate the first end of the shaft, wherein the main housing is configured to be positioned out of the body of water when the trolling motor assembly is attached to the watercraft and the trolling motor housing is submerged in the body of water, wherein the main housing is rotationally fixed relative to the watercraft such that the main housing does not rotate with the trolling motor housing;
a direction sensor configured to determine the direction of the trolling motor housing relative to the watercraft; and
a digital display configured to display the direction of the trolling motor housing;
a processor; and
a memory including computer program code configured to, when executed, cause the processor to:
receive direction data from the direction sensor;
generate display data based on the direction data, wherein the display data includes the direction of the trolling motor housing relative to the watercraft; and
cause the display data to be displayed on the digital display,
wherein the digital display is integrated with the main housing and configured to display the display data so as to provide an indication of a current direction of the trolling motor housing relative to the watercraft.

17. The system of claim 16 further comprising:
a speed sensor configured to measure the speed of the watercraft through the body of water;
wherein the computer program code is further configured to, when executed, cause the processor to:
receive speed data from the speed sensor, and
wherein the display data is further based on the speed data.

18. The system of claim 16 further comprising:
a motor sensor configured to measure the output of the trolling motor;
wherein the computer program code is further configured to, when executed, cause the processor to:
receive motor data from the speed sensor, and
wherein the display data is further based on the motor data.

19. The system of claim 16 further comprising:
a battery sensor configured to measure the charge remaining on a battery, wherein the battery is electrically connected to and supplies power to the trolling motor; and wherein the computer program code is further configured to, when executed, cause the processor to:
receive charge data from the battery sensor, and
wherein the display data is further based on the charge data.

20. A method for displaying a current direction of a trolling motor housing relative to a watercraft, the method comprising:
providing a trolling motor assembly configured for attachment to the watercraft, wherein the trolling motor assembly comprises:
a shaft defining a first end and a second end;
a trolling motor at least partially contained within the trolling motor housing, wherein the trolling motor housing is attached to the second end of the shaft, wherein, when the trolling motor assembly is attached to the watercraft and the trolling motor housing is submerged in a body of water, the trolling motor, when operating, is configured to propel the watercraft to travel along the body of water;
a main housing connected to the shaft proximate the first end of the shaft, wherein the main housing is configured to be positioned out of the body of water when the trolling motor assembly is attached to the watercraft and the trolling motor housing is submerged in the body of water, wherein the main housing is rotationally fixed relative to the watercraft such that the main housing does not rotate with the trolling motor housing;
a direction sensor configured to determine the direction of the trolling motor housing relative to the watercraft; and
a digital display configured to display the direction of the trolling motor housing relative to the watercraft;
receiving, at a processor, direction data from the direction sensor;
generating, via the processor, display data based on the direction data, wherein the display data includes the direction of the trolling motor housing; and
causing the display data to be displayed on the digital display, wherein the digital display is integrated with the main housing and configured to display the display data so as to provide an indication of a current direction of the trolling motor housing relative to the watercraft.

* * * * *